United States Patent [19]
Winckler

[11] Patent Number: 5,662,993
[45] Date of Patent: Sep. 2, 1997

[54] CARBON-BASED FRICTION MATERIAL FOR AUTOMOTIVE CONTINUOUS SLIP SERVICE

[75] Inventor: Peter Stanhope Winckler, Ann Arbor, Mich.

[73] Assignee: General Motors Corporation, Detroit, Mich.

[21] Appl. No.: 525,486

[22] Filed: Sep. 8, 1995

[51] Int. Cl.$^6$ ..................................................... B32B 7/00
[52] U.S. Cl. ..................... 442/101; 428/408; 428/902; 427/389.9; 442/265
[58] Field of Search ..................................... 428/272, 408, 428/252, 902, 246; 427/389.9

[56] References Cited

U.S. PATENT DOCUMENTS

| | | | |
|---|---|---|---|
| 3,927,241 | 12/1975 | Augustin | 428/408 |
| 4,045,608 | 8/1977 | Todd | 428/251 |
| 4,291,794 | 9/1981 | Bauer | 192/107 M |

FOREIGN PATENT DOCUMENTS

| | | |
|---|---|---|
| 37104 | 10/1981 | European Pat. Off. . |
| 393845 | 10/1990 | European Pat. Off. . |
| 510875 | 10/1992 | European Pat. Off. . |
| 581696 | 2/1994 | European Pat. Off. . |
| 2430545 | 2/1980 | France . |

OTHER PUBLICATIONS

European Search Report & Annex corresponding to EP 96 20 2270 dated 29 Nov. 1996.

*Primary Examiner*—Christopher Raimund
*Attorney, Agent, or Firm*—Cary W. Brooks

[57] ABSTRACT

The present invention provides a wet-friction material capable of extensive continuous sliding performance at very low slipping speeds without inducing shutter, squawk or chuggle. The present invention includes a friction material having a woven carbon fabric to which a resin, preferably a phenolic resin, has been applied. The phenolic resin is entirely contained within the strand and the strands are intentionally incompletely filled. This combination provides for maximum open area texture for gross flow and drainage, microporosity or microtexture for the destruction of any potential hydrodynamic films and at the same time provides an extremely strong and durable structural composite. The friction material may include an over and under stacking and integration of the less than completely filled strands which is more than adequate for even the severest loading applications.

26 Claims, 3 Drawing Sheets

CARBON-BASED FRICTION MATERIAL FOR AUTOMOTIVE CONTINUOUS SLIP SERVICE

The invention relates to carbon-based friction materials for automotive continuous slip service, and more particularly for applications in torque converters.

BACKGROUND OF THE INVENTION

Carbon-based materials in the forms of strands, webs or fabrics have a variety of beneficial applications. Aerospace composites include carbon-based fabrics that are completely filled and typically contain 60 percent fiber by volume and are known to have remarkable structural capabilities. For example, carbon-epoxy or carbon-phenol fibers are used by those in the art. Stiffness is an asset for wings, helicopter rotor blades, golf clubs and tennis rackets. Further, pyrolytic carbon-based fabrics use carbon atoms to bind or bridge fibers together can be formed into brake rotors which are rigid in nature. Stiffness is also a key property to performance of such brake rotors at about 50 percent fiber by volume. However, for frictional materials, stiffness is undesirable as it localizes, intensifies and makes more cyclically acute the crush-loading, thermal-stress and twisted fiber and pair bundle stresses such as when utilized in continuous slip service applications.

In frictional materials of the prior art, these carbon fibers have been formed into a mat or woven together and immersed in or impregnated with an organic binder such as a phenolic resin. However, these prior art system as described hereafter have shortcomings in terms of their frictional properties, heat dissipation and structural integrity when fabricated into frictional devices.

Winckler, U.S. Pat. No. 4,700,823, discloses a locking differential including an oil lubricating clutch assembly having a plurality of interleaved friction discs formed of steel and squeezed together to retain rotation of differential side gears. Adjacent friction discs have mutually facing friction surfaces. One of each mutually facing friction surface is defined by the metal forming the disc and the another surface is defined by a pyrolytic carbon composite friction material. In one form, the friction material includes a mesh of cloth substrate formed of carbon fibers, which may be woven into a single layer of cloth, and a coating of carbon deposited on the fibers by chemical vapor deposition. The coating of carbon is sufficient to provide a friction material having a relatively open mesh which is readily penetrated by an adhesive to improve bonding of the friction material to the disc. Such adhesive is added for bonding to a disc and so that the adhesive penetrates the mesh but does not extrude completely through to the frictional surface of the material.

Bauer, U.S. Pat. No. 4,291,794, discloses a power transmission-energy absorption device and carbon composite friction facing material for use therein substantially the same as Winckler. This system includes a carbon composite friction membrane of fibrous material. The fibers of the material are carbonized or graphitized so that a pyrolytic material is deposited interstitially of the fibrous material. Thus, both Winckler and Bauer provide a mesh wherein oil flows along the surface of the mesh due to the texture provided by the woven pyrolytic carbon fibers.

Graham et al, U.S. Pat. No. 3,261,440 discloses clutch and brake assemblies with artificial graphite and organic resins and adhesives such as a furfural resin or phenol formaldehyde reins, or elemental carbon as a binder. The frictional material has a porosity which is preferably an interconnecting porosity and permeability. However, resins such as phenols are typically detrimental with oils because the phenol resin inherently generates a large lock-up spike. To overcome this additives are used in the oils, but these additives breakdown over time reverting to adversely effect performance of the friction material. Further, phenolic resins have excellent "wetting" characteristics which strongly encourages hydrodynamic low friction behavior.

Augustin, U.S. Pat. No. 3,927,241 discloses a dual layer clutch system having a first layer designed, by being compliant to distribute energy and a second layer designed for frictional properties. The frictional material includes carbon fibers impregnated with a phenol resin solution wherein the resin content is 60 percent.

The present invention provides advantages over the prior art.

SUMMARY OF THE INVENTION

The present invention provides a wet-friction material capable of extensive continuous sliding performance at very low slipping speeds without inducing shutter, squawk or chuggle. The present invention includes a friction material having a woven fabric make from fibers that are spun into yarn bundles and twisted into strands. A binder, preferably a phenolic resin, is applied so that a minimum amount of the binder is present on the fibers but sufficient to bind the fibers together at their natural points of connection. The resin is entirely contained within the strands and the strands are intentionally incompletely filled. Lengthwise gaps formed along the spun and woven fibers are not filled with binder so that the gaps are available as a flow path for oil through the body of the woven friction material. This combination provides for maximum open area texture for gross flow and drainage, porosity defined as macrotexture for the destruction of any potential hydrodynamic films and at the same time provides an extremely strong and durable structural composite. The friction material may include an over and under stacking of the woven structure and integration of the less than completely filled strands which is more than adequate for even the severest loading applications. In the preferred embodiments the invention provides for 1) stability in friction performance, 2) substantially improved oil flow through the body of the frictional material improving heat transfer and eliminating hydrodynamic effects, and 3) improved strength of the interlock between seamed pieces of frictional material.

The resin being entirely contained within the intentionally incompletely filled strands provide, on a microscale, pits, capillary flow and surface flow channels. The fabric is braided or woven to provide on a macroscale maximized open-areas, macrotexture, for gross flow and drainage to avoid high viscosity, flooding and hydrodynamic fibers. The microporosity or microtexture of the strands eliminates any hot-oil, "bearing-like", hydrodynamic films and also provides performance-tailored, extremely strong and durable structure composite.

These and other objects, features and advantages of the present invention will become apparent from the following brief description of the drawings, detailed description and appended claims and drawings.

DETAILED DESCRIPTION

Figure 1:
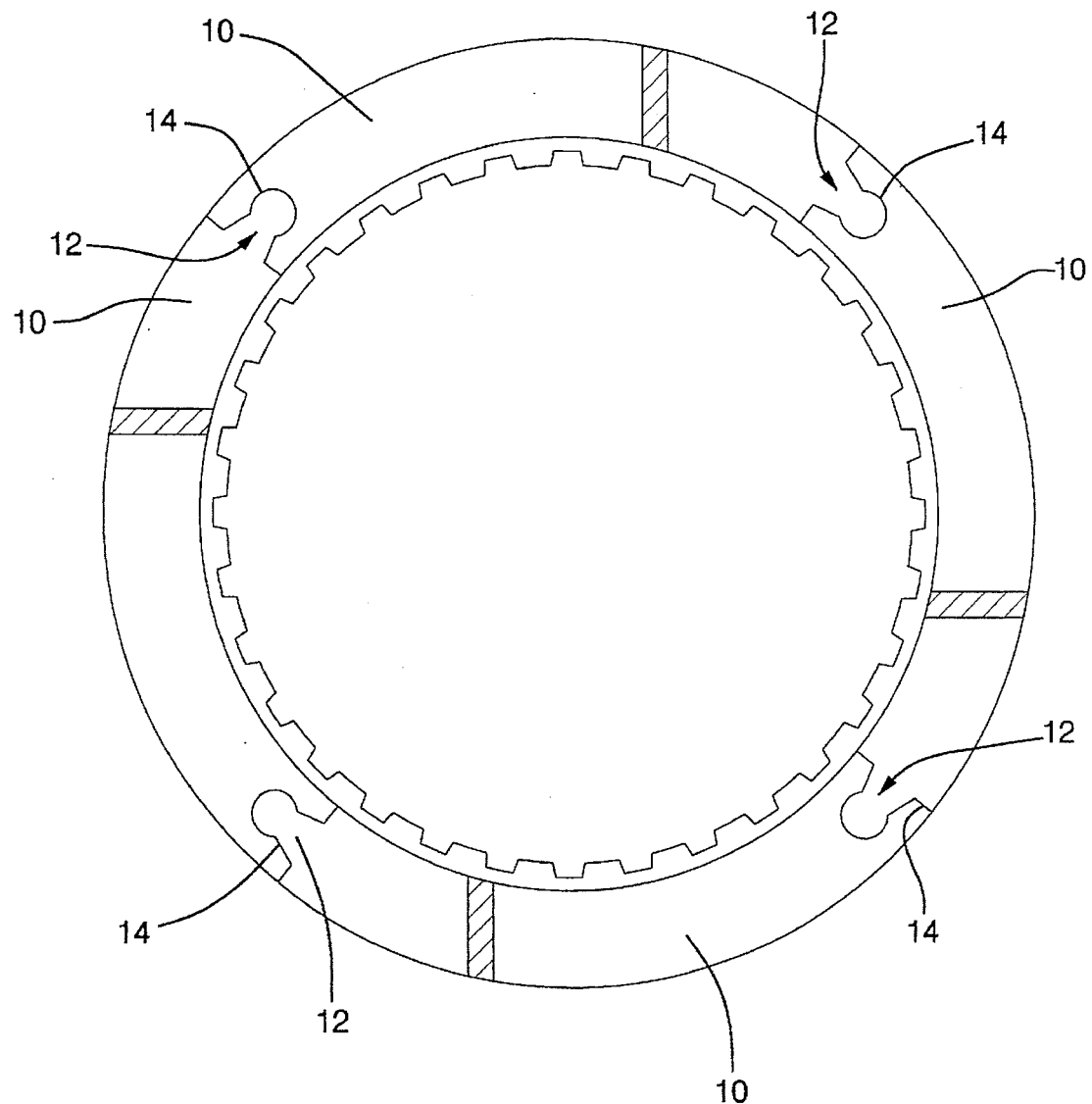
FIG. 1 is an illustration of a friction material for a torque converter having interlocks according to the present invention.
Figure 2A:
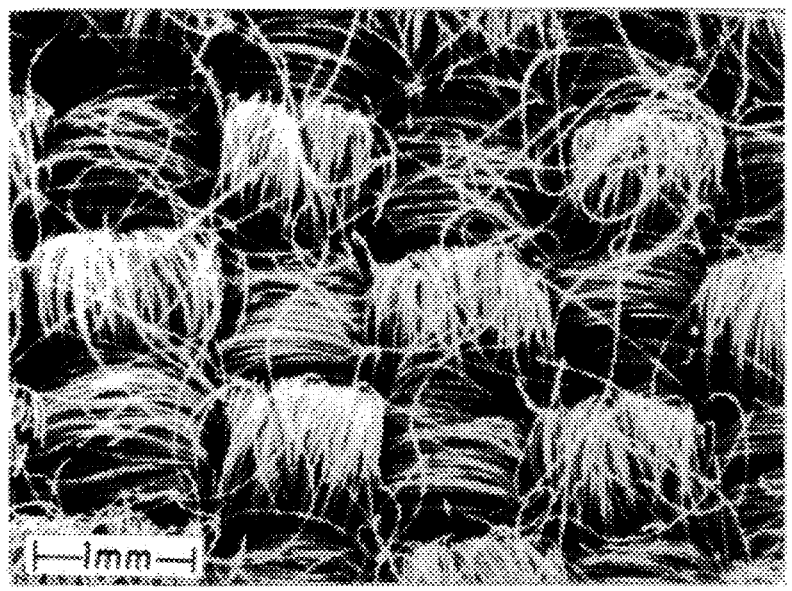
FIGS. 2A–2D are photomicrographs, each showing a friction material according to the present invention.
Figure 2B:
Figure 2C:
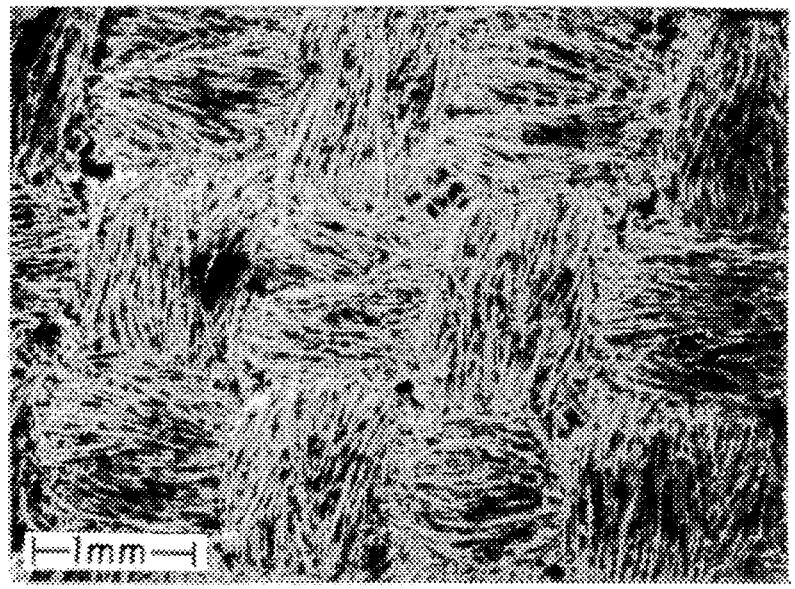
Figure 2D:
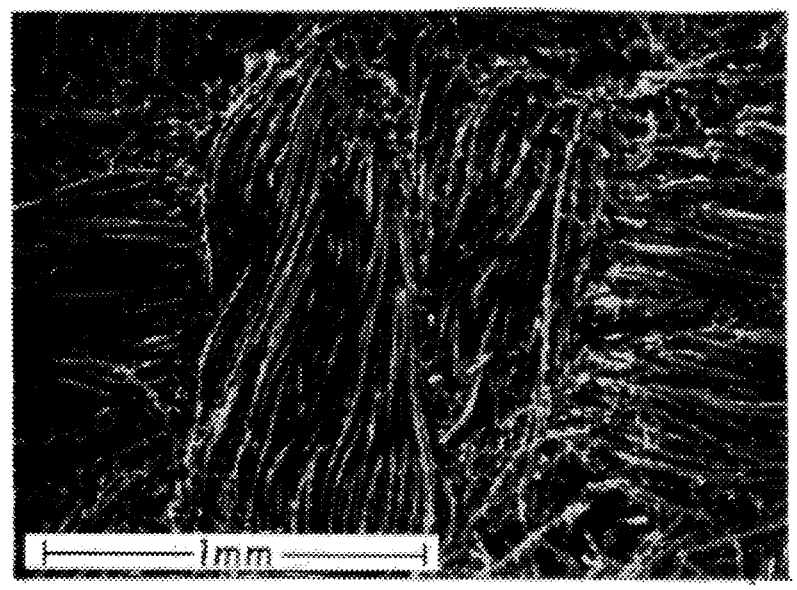

FIG. 1 illustrates a friction material configured in separate pieces 10 each having an interlock design 12 defining a seam 14 between pieces according to the present invention.

The present invention is directed to a carbon-based friction material for automotive continuous slip service such as that in torque converter clutches. A torque converter clutch in which the carbon-base friction material of the present invention may be utilized is disclosed in Dull et al, U.S. Pat. No. 5,195,621 issued Mar. 23, 1993, a continuous slipping clutch is disclosed in Malloy, U.S. Pat. No. 4,169,526 issued Oct. 2, 1979, the disclosures of which are hereby incorporated by reference.

In its simplest form, the friction material of this invention consists of woven cloth that has a binder applied thereto, preferably a phenolic resin. Preferably the woven cloth is made from carbon fibers. Attributes of carbon fiber for continuous slip service, surprisingly, have been overlooked repeatedly due to the lower typical friction coefficient and higher material cost. Also, the cheaper, "wet-layed" carbon fiber construction (felted material smattered with resin) tends to have poor wear characteristics. What is unique about the material of this invention is its structure. First, the resin is entirely contained within the strands. Second, the strands are intentionally incompletely filled. Third, the weave or braid in preferred configurations insures substantial voids, internal and surface flow channels, and an extensive array of discrete (small surface area), compliant, durable, contact points. These contact points similarly have, in microscopic scale, pits (void-equivalent), capillary (internal-equivalent) flow, and surface flow channels. This combination provides: maximized open-areas, macrotexture, for gross flow and drainage to avoid high-viscosity, flooding, hydrodynamic films; porosity or microtexture for the destruction of any potential hot-oil, "bearing-like", hydrodynamic films; and yet, a performance-tailored, extremely strong and durable structural composite.

The fabric constructions of primary interest are woven (in a wide variety of single and multi-dimensional forms) and braided (flat, continuous/circular or comparable forms). The invention specifically does not include "wet-layed", non-woven (felt), "paper", molded, or other compacted and relatively uniformly dispersed constructions, unless it is intentionally pierced and saturated, or by some similar artifice a duplication of this invention. That is, having a very structurally discrete combination of numerous and incompletely saturated islands of (continuous or chopped) fiber bundles and obvious voids/drainage.

The carbon fiber can be spun or co-mingled with other fibers such as "glass", silicon carbide (as a class of fibers), soft/hard ceramics (as a class of fibers), aramid, boron, polytetrafluoroethylene or other fibers or coated fibers, familiar to one in the friction, paper, or composites industries. In particular, the carbon fiber will be spun or co-mingled with thermoplastic or thermoset resin/adhesive fibers. In fact, it need not be carbon at all. For example, some success has been achieved with "NEXTEL" AF-40, woven glass/soft-ceramic, manufactured by 3M, St. Paul, Minn.

Inevitably, a binder layer of resin will result on the surface of the strands or bundles. However, this will, or is intended to be, substantially limited to a "film" or irregular monolayer that is dimensionally insignificant. In the case where minerals or particles may be added, this would still apply, although the irregular monolayer would likely reflect the thickness of the particles in question. Further, it should be noted that the overall, apparent, measured thickness of the friction material, because it is typically a soft fabric and measured under pressure, always increases from the reinforcement (added stiffness). Under a suitable microscope, the relative dimensional insignificance resulting in light of this invention can be judged. A typical coating would be 2–5 microns, (80–200 millionths of an inch).

Some latitude is required with regard to defining "filled". In aerospace applications, the composite structure is considered "filled" when then the "voids" become insignificant and the resin matrix material otherwise virtually fills the composite because it is highly compressed. This is logical, as the objective is intimate proximity of the fibers with maximum structural adhesion by the resin. The objective of this invention is different; to insure some degree of "microporosity" and/or "microtexture" thoroughly throughout each strand or bundle to in turn ensure that hydrodynamic (lower-friction) oil-films cannot form (and cause shudder). For this reason, voids and capillary channels are highly desirable. They are provided and protected by intentionally limiting the bonding-compression; by (in most cases) substantially curing the composite structure prior to bonding; by powder-coating or co-mingling or twisting with continuous-filaments; and spinning, and twisting pairs of chopped-fibers. All are in supplement to weaving, braiding or other artifices to prevent hydrodynamics on the macroscale. Therefore, "less than completely filled" refers to the strands or bundles in their woven or braided free state and, subsequently, in their bonded, partially compressed state, but not relative to the theoretical volume fill as is aerospace practice.

In wet-friction applications, hydrodynamic films are overwhelmingly the number one cause of friction instability and phenomenon such as shudder, squawk, and chuggle. Boundary layer films exist when hydrodynamic films do not. They are much more stable and remarkably tailorable by such factors as oil-chemistry and friction material selection. Mixed-film is used to describe the dramatic transition region of maximum instability between the two primary states. Typical boundary coefficients exceed 0.10, whereas hydrodynamic coefficients are below 0.04. Hydrodynamic films are always microscopically thin (microns or millionths of an inch) and need an effective area on which to exist. The teachings and means of this invention prevent such films and, in concert with materials familiar to the art result in an exceptionally stable product suitable for all types of wet friction applications including transient brake and continuous slip applications.

Co-mingled spun-yarn filament, such as that formerly produced by Heltra, is a further alternative example, as is powder-coated or thermoplastic solvent saturated fabric, or thermoplastic-coated fibers that are chopped and spun and then woven or braided. PEK (poly-ether-ketone), PEEK (poly-ether-ether-ketone) and PEKK are obvious alternative thermoplastics, although they might require laminated bonding adhesive. Polyimides and PEI are obvious alternative thermosets.

An additional feature of the invention is the enhancement of interlock quality, particularly for the first preferred embodiment. The high-modulus/stiffness of the carbon fibers is enhanced by the presence of the resin. Further, due to the up and down nature of the weaves, the actual strand length is typically 30% longer than its apparent length when viewed from above. During bonding, as the height is reduced, the strands effectively lengthen within the constraints of the bonding fixture. The strands have resin wicked along the fiber and are not completely filled and thus the strands are free to move. For the relatively precise, typical interlocks, this results in intense engagement of fibers across the seam for even the shorter interlock strands. Thus, the interlocks become almost invisible and their integrity is exceptional.

The present invention may utilize a carbon-based friction material having carbon strands. Such material is available from Textron Specialty Corp., Lowell, Mass. The carbon-based friction material is dipped in a resin solution, preferably a phenolic resin, which is a highly solvented saturating solution. Preferably the solution comprises about 18 to about 40 weight percent phenolic resin and about to about 60 to 82 weight percent solvent. When the phenol resin is 18 to 26 weight percent of the solution optimal friction characteristics are achieved. When the phenol resin is 26 to 35 weight percent of the solution progressive diminishment of frictional performance occurs (but improved wear durability with poorer mating surfaces is obtained). With 35 to 40 weight percent only marginal frictional performance is achieved. Above 40 percent by weight, the performance characteristics of this invention are not achieved. Likewise, the resin is its dried state on the fiber is 18 to 40, preferably 18 to 35 and most preferably 18 to 26 weight percent of the fiber and resin in the dried state. A suitable phenolic resin is available from Ashland Chemical Co. under the trademark A295-E50. Suitable solvents are alcohols, examples of which are ethanol and isopropyl alcohol. The resin is wicked along the fibers as illustrated by the white area along the fiber in FIG. 2 microphoto D.

After the carbon-based friction material has been dipped in the phenolic solution, excess phenolic resin is drained away without roller or fixed-gap squeezing. However, a fixed-gap control, particularly if angled can be helpful in wiping off solvented-solution coming out of the dipping tank, but any significant squeezing beyond the tolerance range of the woven carbon fabric reduces product quality by creating an interstitial resinous middle zone. This reduces oil flow through the material and has a detrimental effect on the interlock of seamed pieces of friction material. The spun fibers define lengthwise gaps along the fibers which are substantially void of any binder. That is, the spaces where the fibers are not present are totally open and empty of resin. This provides for substantial flow passages on and through the material which significantly increases the cooling and slip capability of the friction material. Further, for torque converter clutches (TTC's), the resulting flow is significant and controllable, a first feature of the invention.

That flow is controllable, is a first feature of the invention. Selection of weave/braid, bonded-height, degree of cure prior to bonding, aerial density, particle infiltration, and resin content are all key parameters for controlling oil flow while retaining structural integrity, and balancing other properties such as compliance.

A variety of weave/braid designs may be utilized. 8-Harness Satin, loop-type Jersey Knit, and loosely braided weaves that can "lay flat" will have negligible flow. Plain and Basket weaves or braids with tightly twisted bundles or strands will have substantial flow. Asymmetric fabric tensioning can also increase flow. Typically, the fibers are about ½ to 4 inches long, about 6 to 12 microns in diameter and the binder on the fiber is less than 1/1000 inches (25 microns) thick and preferably less than the fiber diameter.

Bonded height has perhaps the next largest influence, given a reasonable combination of other parameters. Compressing the material more intensely within the bonding fixture reduces the flow in several ways simultaneously. Surface flow due to the gross surface texture is reduced, because added compression deforms/lessens the resulting texture. Flow through the material is also reduced. With surprising consistency, at 55–60% volume fill, flow is severely "choked". Again, with surprising consistency, at 40–45% volume fill, optimum flow and several other properties (such as bonding pressure) often result.

Cure is a particularly effective parameter, because it (a) determines the extent to which the material conforms to the shape of the die and (b) the compliance of the bonded material (the squeezing off of flow under pressure). Reducing bond-height, thereby increasing the percentage of fill, obviously reduces flow. However, the opposite is true of resin content. Increased resin content within the intentionally, incompletely filled strands has little blocking effect, because the flow is primarily across the friction surface and around the strands. Flow within the strands (i.e., capillary action) to avoid hydrodynamics while crucial important is of small magnitude. However, for torque converter clutches, increased resin content greatly improves stiffness, reducing compression under load. This effect is equivalent to that of pyrolytic (CVD) carbon reinforced, woven-carbon cloth. This benefit becomes limited for either when compliance is affected. Note, further advantages over pyrolytic carbon are that much less weight (and volume) addition of matrix material is required to achieve the desired result, and the material of this invention experiences virtually no change in thickness.

Further, the cure of the material prior to bonding also affects the friction performance. With extensive pre-cure, the resin is retained interstitially and well diffused within the carbon fiber strands. With less pre-cure, during bond the resin can be recombined at the surface of the flattened strands forming hard, dense spots/flats precluding macro-texture and microporosity and producing hydrodynamic films.

It is important to note that the adhesive used is a film adhesive and less than 4/1000 inches thick in the preferred configuration. It in no way significantly fills the material as shown in Winckler or Bauer. Effective bonding, while satisfactory, is achieved at the woven material "peaks" only. The adhesive film beneath the void regions, though cured, remains virtually unaltered. A suitable adhesive is a nitrile phenolic and is derived from #86005 available from Raybestos Corp. of Farmington, Mich.

FIRST PREFERRED EMBODIMENT

This friction material consists of a single layer of symmetrically plain-woven, spun-yarn carbon-fiber fabric, saturated with phenol-formaldehyde resin. It is laminated with two layers of 1-mil nitrile-phenolic adhesive for segmenting and bonding to the torque converter clutches. The fabric can be provided by Textron Specialty Materials, and consists of: twisted pairs or triples of spun-yarn bundles/strand, 18–33 strands/inch, 6–9 oz/yd.2 aerial carbon fiber density, 18–35% of total, by weight resin content, 20–37% volume density as saturated, and 35–50% volume density as bonded, in all cases, the resin is effectively contained within fibers of the fabric. Saturation and initial cure can be provided by National Coating Corp., Mass. using Ashland Chemical Co. A295-E50, highly solvented with ethanol or isopropyl alcohol to readily wick into the fibers. Saturation line speed is controlled to prevent the resin from boiling out onto the friction material surface, voids, or even into the fabric interstitial crossover points. Squeeze rollers are specifically not used and any fixed gap spacers are limited to the free-height tolerance range of the fabric only to assure excess trough-resin removal. This material is not limited to a single layer, and a lower modulus, more compliant underlayer may be included that, for example, need not be of similar construction.

SECOND PREFERRED EMBODIMENT

This friction material utilizes bundles of continuous-filament carbon, that may be co-mingled, saturated, or powder-coated with PEEK thermoplastic resin, and circular-braided and flattened (or simply flat-braided). Flattened thickness is targeted for 30–100% above bonded thickness, which is desired from 0.43–0.75 mm. Flattened width is targeted for 12–14 mm and a braid angle of approximately 45 degrees is beneficial to prevent fiber breakage when flattened and/or bonded. Fiber bundles would range from 0.5k–6k plus co-mingled fibers, if applicable. Further, these bundles would be twisted from one to several twists per foot, to minimize their bulkiness during weaving and prior to bonding. During bonding, the twisting also prevents the normally quite parallel fibers from spreading out, thereby assuring void area and texture. The co-mingled carbon/PEEK bundles can be obtained from Textile Products, Inc., and the braiding processed by Fabric Development Co. Further, the bundles are intentionally incompletely filled with the resin consistent with this invention.

For bonding, no adhesive or laminating process would be required. The braid would be heat-seared and cut to the precise desired torque converter clutch circumferential length by either laser-processing (prior to delivery) or hot die crimped and cut. A fused and partially circumferentially-flattened ring could also be formed at this time. The ring would then be inserted into the bonding-fusing fixture where the pressure plate would be induction heated and allowed to cool sufficiently for removal. Processing time to densify the co-mingled fibers, fuse the flattened circular-braid, and bond the ring is expected to be 3–15 seconds.

With respect to the two preferred embodiments: one includes a thermoset resin with spun-arm filament woven strands, and the other includes a thermoplastic resin with continuous filament twisted and braided strands/bundles. In either case, the advantages of the preferred embodiments are the same.

(1) To prevent flooding or other gross hydrodynamic filming by providing substantial voids, texture, and drainage (defined as macrotexture and macroporosity).

(2) To prevent intensive interfacial hydrodynamic films by intentionally incomplete filling of the woven or braided strands that comprise the friction material, and particularly its contact interface. The resulting pits (small voids), texture and capillary drainage (defined as microtexture and microporosity).

(3) To provide a simultaneously suitable combination of structural integrity, compliance, cooling oil-flow control, and fiber orientation. This is achieved by material-selected composition, weave or braid (including type, bundle size, twisted pairing, and twists/inch), aerial density, bonded thickness, cure process, and bonding fixture design.

(4) To control dynamic and static wet-friction, and particularly static to dynamic ratio by selection and control of material composition (such as carbon fibers), fiber orientation, infiltration of particles, % saturation, cure control, and prevent the localized, intermittent attainment of low coefficient and unstable hydrodynamic films.

(5) To control the uniformity in amount and distribution of the cooling oil flow, negating or greatly reducing the need for grooving, orifices or other supplemental means and providing optimal cooling distribution relative to the state-of-the-art.

(6) To enhance interlock quality by capitalizing on the stiffness of carbon fibers, the nature of the resin reinforcement of this invention, and the interwoven structure. In particular, by wicking in the saturate and minimizing bridging and rigidization between the strands, the strands during bonding are free to extend and aggressively engage each other forming excellent, intense interlocks.

(7) The second (thermoplastic) preferred embodiment also features: elimination of the adhesive and all laminating processes, 100% material utilization, reduction to one or zero interlocks, no inner or outer edge cut fibers or debris, and an 3–15 second bond cycle. The preferred resin, PEEK, is odorless, undergoes no chemical change, and is as inert as nylon or Teflon.

In wet-friction applications, hydrodynamic films are the number one cause of friction instabilities such as shudder, squawk, and chuggle. Boundary layer films exist when hydrodynamic films do not. They are much more stable, and tailorable by oil-chemistry and friction material selection. Hydrodynamic films are always microscopically thin and need an effective area on which to exist. The teachings and means of this invention prevent such films and, in concert with materials familiar to the art result in an exceptionally friction stable and wear durable product.

What is claimed is:

1. A method of making a carbon-based friction material for automotive continuous slip surface applications comprising:

providing a woven fabric consisting of carbon-based fibers spun into bundles and the bundles twisted into strands;

applying a resin solution to said woven fabric so that the resin solution wicks along the fibers leaving unfilled interstitial areas within strands so that the friction material has a microtexture and a microporosity that is open to provide a flow path for oil through the friction material; and curing said resin in said solution, wherein said resin solution comprises about 18 to about 40 weight percent phenolic rein and about 60 to about 80 weight percent of an alcohol based solvent, and wherein said resin in a dried state comprises about 18 to about 40 weight percent of said resin and fiber together.

2. The method of claim 1 wherein said fibers comprise carbon.

3. The method of claim 1 wherein said resin comprises a thermoset resin.

4. The method of claim 1 wherein said resin comprises a thermoplastic resin.

5. A method as set forth in claim 1 wherein said resin comprises about 18 to about 26 weight percent of said resin and fiber together in a dried state.

6. A product comprising a friction material, said friction material comprising a plurality of fibers formed into strands woven or braided together into a fabric, said strands having a binder wicked along each of said fibers so that said fibers are bound together along points of contact thus leaving gaps between fibers substantially free of binder so that the friction material has a microtexture and microporosity that is open to provide a flow path for oil through the friction material substantially eliminating hydrodynamics across an engagement surface of the friction material whereby consistent and stable friction performance is achieved and shutter, chuggle and squawk is controlled, and wherein said binder in a dried state comprises about 18 to 40 weight percent of the binder and fiber together.

7. A product as set forth in claim 6 wherein said fibers comprise carbon.

8. A product as set forth in claim 6 wherein said binder comprises a phenolic resin.

9. A product as set forth in claim 8 wherein said phenolic resin comprises about 18 to about 40 weight percent of said resin and fiber together.

10. A product as set forth in claim 6 wherein said binder comprises a thermoset resin.

11. A product as set forth in claim 6 wherein said binder comprises a thermoplastic resin.

12. A product as set forth in claim 6 wherein said binder is present in about 18 to about 26 weight percent of the binder and fiber in a dried state.

13. A product comprising:

a first substrate;

a friction material comprising an engagement surface for frictionally engaging the first substrate and a body portion underlying the engagement surface;

a second substrate; and an adhesive layer which secures the body portion of the friction material to the second substrate, said friction material comprising a plurality of fibers spun or twisted into strands and woven or braided together into a fabric, said strands having a binder wicked along each of the fibers so that said fibers are bound together leaving gaps along the fibers substantially free of binder so that the friction material has a microtexture and a microporosity that is open to provide a flow path for oil through the friction material, said woven or braided fabric having voids and holes which provide the friction material with a macrotexture and macroporosity thus allowing for a controlled volume of oil flow through the body of the friction material without the use of orifices or grooves formed in the friction material, and wherein said binder in a dried state comprises about 18 to 40 weight percent of the binder and fiber together.

14. A product as set forth in claim 13 wherein said fibers comprise carbon.

15. A product as set forth in claim 13 wherein said binder comprises a phenolic resin.

16. A product as set forth in claim 15 wherein said phenolic resin comprises about 18 to about 40 weight percent of said resin and fiber together.

17. A product as set forth in claim 13 wherein said binder comprises a thermoset resin.

18. A product as set forth in claim 13 wherein said binder comprises a thermoplastic resin.

19. A product as set forth in claim 13 wherein said binder is present in about 18 to about 26 weight percent of the binder and fiber in a dried state.

20. A product comprising:

at least a first and second piece of friction material, each piece of friction material comprising a plurality of fibers spun into bundles, each bundle having a binder wicked along the fiber so that the fibers are bound together leaving gaps along the fibers substantially free of said binder, said bundles being twisted into strands and said strands being woven together to form a fabric, each piece of friction material being secured to a substrate and pieced together along an interlock seam, wherein said bundles are not bound together by said binder and are free to move so that upon application of force to the pieces of friction material said bundles elongate and fibers from each piece of friction material engage each other across the interlock seam providing improvement in the strength of the interlock seam between each piece of friction material, and wherein said binder in a dried state comprises about 18 to 40 weight percent of the binder and fiber together.

21. A product as set forth in claim 20 wherein said fibers comprise carbon.

22. A product as set forth in claim 20 wherein said binder comprises a phenolic resin.

23. A product as set forth in claim 20 wherein said phenolic resin comprises about 18 to about 40 weight percent of said resin and fiber together.

24. A product as set forth in claim 20 wherein said binder comprises a thermoset resin.

25. A product as set forth in claim 20 wherein said binder comprises a thermoplastic resin.

26. A product as set forth in claim 20 wherein said binder is present in about 18 to about 26 weight percent of the binder and fiber in a dried state.

* * * * *